United States Patent
Schloer et al.

(10) Patent No.: US 12,456,065 B2
(45) Date of Patent: Oct. 28, 2025

(54) METHOD FOR DETERMINING SIMULATION DATA

(71) Applicant: Robert Bosch GmbH, Stuttgart (DE)

(72) Inventors: Jakob Schloer, Rottenburg (DE); Julian Schmidt, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1001 days.

(21) Appl. No.: 17/449,902

(22) Filed: Oct. 4, 2021

(65) Prior Publication Data

US 2022/0180233 A1 Jun. 9, 2022

(30) Foreign Application Priority Data

Dec. 9, 2020 (DE) .......................... 102020215543.7

(51) Int. Cl.
*G06N 7/01* (2023.01)
*G06F 18/214* (2023.01)
(Continued)

(52) U.S. Cl.
CPC ............ *G06N 7/01* (2023.01); *G06F 18/2148* (2023.01); *G06F 18/22* (2023.01); *G06F 30/27* (2020.01); *G06F 30/20* (2020.01)

(58) Field of Classification Search
CPC ....... G06N 7/01; G06F 18/2148; G06F 18/22; G06F 30/27; G06F 30/20; G06F 2111/08; G06F 30/15; G06F 17/18
See application file for complete search history.

(56) References Cited

U.S. PATENT DOCUMENTS

| 2015/0371151 A1* | 12/2015 | Georgescu ............. G06N 20/00 706/12 |
| 2021/0117842 A1* | 4/2021 | Smith ..................... G06N 3/088 |
| 2022/0180233 A1* | 6/2022 | Schloer .................... G06N 7/01 |

OTHER PUBLICATIONS

Xueqian F, Qinglai G, Hongbin S, Zhaoguang P, Wen X, Li W. Typical scenario set generation algorithm for an integrated energy system based on the Wasserstein distance metric [J]. Energy. 2017;135:153-70. (Year: 2017).*

(Continued)

*Primary Examiner* — Chuen-Meei Gan
(74) *Attorney, Agent, or Firm* — NORTON ROSE FULBRIGHT US LLP

(57) ABSTRACT

A method for determining simulation data. The method includes: providing a simulation probability distribution including a number x of simulation time series, and providing a reference probability distribution including a number y of reference time series; determining a first Gaussian random process for the simulation probability distribution, and determining a second Gaussian random process for the reference probability distribution, a Gaussian random process being assigned a mean and a covariance matrix; calculating a model error with the aid of the 2-Wasserstein distance between the first Gaussian random process and the second Gaussian random process over the Euclidian distance of the means of the first and second Gaussian random processes and the trace of the covariance matrices of the first and second Gaussian random processes; and determining a family of simulation probability distributions by integrating the model form error into an updated Gaussian random process.

11 Claims, 6 Drawing Sheets

(51) Int. Cl.
    G06F 18/22    (2023.01)
    G06F 30/27    (2020.01)
    G06F 30/20    (2020.01)

(56)             References Cited

OTHER PUBLICATIONS

Oberkampf et al., "A Comprehensive Framework for Verification, Validation, and Uncertainty Quantification in Scientific Computing," Computer Methods in Applied Mech. Engineering, vol. 200, 2011, pp. 2131-2144.
Malag et al., "Wasserstein Riemannian Geometry of Positive-Definite Matrices," Collegio Carlo Alberto, 2017, pp. 1-36. <https://www.carloalberto.org/wp-content/uploads/2018/11/no.520.pdf> Downloaded Sep. 29, 2021.
Oberkampf et al., "Verification and Validation in Scientific Computing," Cambridge University Press, 2010.

* cited by examiner

METHOD FOR DETERMINING SIMULATION DATA

CROSS REFERENCE

The present application claims the benefit under 35 U.S.C. § 119 of German Patent Application No. DE 102020215543.7 filed on Dec. 9, 2020, which is expressly incorporated herein by reference in its entirety.

FIELD

The present invention relates to a method for determining simulation data.

BACKGROUND INFORMATION

Reference data are normally collected at certain points, the so-called validation points, in the parameter space of the simulation model, in order to validate a simulation model. Generally, these reference data come from actual validation experiments or from simulation runs of a highly accurate reference model. A so-called model form error, a variable, which indicates the difference between the simulation model and the reference, may be calculated at the validation points.

In the validation of a temporally variable simulation model, a difference between a simulation model and reference model may be quantified by using signal metrics for the temporally variable simulation data, as well as a statistical metric, such as the Wasserstein distance.

In general, the use of the simulation model necessarily requires that it be carried out at points, at which the simulation model has not been validated by comparison of measured and simulated data.

Nevertheless, in order to be able to take into account the effect of the model form error, it is conventional that, for scalar simulation data, simulation data may be constructed, which differ from the original simulation data in accordance with the reference data.

To validate scalar signals, for example, a validation framework based on the so-called area validation metric described, for example, in Oberkampf, William L. and Christopher J. Roy, "Verification and Validation in Scientific Computing," Cambridge University Press, 2010, and in Oberkampf, William L. and Christopher J. Roy, "A Comprehensive Framework for Verification, Validation, and Uncertainty Quantification in Scientific Computing," Computer Methods in Applied Mechanics and Engineering, 200(25-28), 2131-2144, 2011, is available. Normally, both the simulation results and the reference measurements, which are ideally actual experiments, are taken as samples from two different random distributions. This means that an (empirical) distribution function or cumulative distribution function (CDF) is generated from the data for both the simulation and the reference. The reason for this is that the reference signals come, for example, from actual measurements or from a reference model and therefore normally have a natural variability. For example, different parameters may vary in different run-throughs of a measurement. Regardless of how effectively one attempts to control all parameters of a measurement, some of them will vary in each run-through of the measurement. If one assumes a deterministic simulation model, then, in the case of fixed parameters, the simulation would always deliver the same result. Therefore, the experiment is remodeled in the simulation by randomly varying some of the parameters and recording the results. If these parameters, which are referred to as aleatoric parameters, are distributed in the correct manner, the specific simulation data set will be highly similar to the respective, corresponding reference data set, if the simulation model reproduces the relevant effects correctly. Viewed mathematically, the comparison between simulation and reference therefore corresponds to the calculation of the distance between two probability distributions. To that end, these probability distributions are compared to each other, using a metric for distribution functions, such as the area validation metric. In the case of the area validation metric, the area between the two distribution functions is utilized as a measure of the mismatch of the two distributions.

In order to be able to consider the effect of the model form error, a metamodel, which extrapolates the model form error, is used on points, at which no validation experiment has been carried out, in order to estimate the scalar model form errors at these points. These extrapolated errors are then added to the simulation data at these points. This method is also referred to as model form error updating.

The conventional method, in particular, the area validation metric, is not usable in the multidimensional case. Thus, in particular, for time series signals, no method, by which it is possible to take the model form error into account in the simulation data, is available.

Therefore, an object of the present description is to provide a method, which allows the model form error to be taken into account in time-series simulation signals.

SUMMARY

One specific example embodiment of the present invention relates to a method for determining a simulation model, including the steps:
  providing a simulation probability distribution including a number x of simulation time series, and providing a reference probability distribution including a number y of reference time series;
  determining a first Gaussian random process for the simulation probability distribution, and determining a second Gaussian random process for the reference probability distribution, a Gaussian random process being assigned a mean and a covariance matrix;
  calculating a model error with the aid of the 2-Wasserstein distance between the first Gaussian random process and the second Gaussian random process over the Euclidian distance of the means of the first and second Gaussian random processes and the trace of the covariance matrices of the first and second Gaussian random processes; and
  determining a family of simulation probability distributions by integrating the model form error into an updated Gaussian random process.

A specific simulation time series and a respective reference time series are each supplied as an n-dimensional vector, where n corresponds to the number of recorded time steps.

The simulation probability distribution includes a number x of simulation time series, and the reference probability distribution includes a number y of reference time series, where x, y∈ℕ and x, y>1.

A first Gaussian random process is determined for the simulation probability distribution, and a second Gaussian random process is determined for the reference probability distribution. The first and the second Gaussian random processes are multivariate normal distributions. In this context, each Gaussian random process is assigned a mean and a covariance matrix:

$$GP_i \sim N(m_i, \Sigma_i),$$

where mean $m_i \in \mathbb{R}^n$ and covariance matrix $\Sigma_i \in \mathbb{R}^{n \times n}$.

Thus, the simulation probability distribution is represented by the first Gaussian random process with $$X_0 \approx N(m_X, \Sigma_X),$$

and the reference probability distribution is represented by the second Gaussian random process with $$Y_0 \approx N(m_Y, \Sigma_Y),$$

The model error between the first Gaussian random process and the second Gaussian random process is calculated, using the 2-Wasserstein distance. In principle, the normalized Euclidian distance metric, also known as the root mean square error RMSE, may be used as a basic distance for determining the distance between two individual time series over a time interval [0, T], which were recorded at n points within this interval $$d(x, y) = n^{-\frac{1}{2}} \|x - y\|_2.$$

The normalized Euclidian distance approximates the integral $L_2$-distance on the interval [0, T] for a large number n of time steps. This basic distance is used to construct the 2-Wasserstein distance.

For normally distributed Gaussian random processes $GP_i \sim N(m_i, \Sigma_i)$ having a mean $m_i \in \mathbb{R}^n$ and a positive definite, in particular, invertible, covariance matrix $\Sigma_i \in \mathbb{R}^{n \times n}$, the following applies for the 2-Wasserstein distance and, therefore, for the model form error $\varepsilon$, where $\varepsilon^2 = W_2^2(X_0, Y_0)$, $$W_2^2(GP_1, GP_2) = \frac{1}{n}\|m_1 - m_2\|_2^2 + \frac{1}{n} tr\left(\Sigma_1 + \Sigma_2 - 2(\Sigma_1 \Sigma_2)^{\frac{1}{2}}\right),$$

referred to in the following as formula (1).

In this case, tr denotes the trace of a matrix. This is described, for example, in Malag, L., Montrucchio, L. and Pistone, G., "Wasserstein Riemannian Geometry of Positive Definite Matrices," arXiv preprint arXiv:1801.09269, 2019.

Thus, the model form error is calculated over the Euclidian distance of the means of the first and second Gaussian random processes and the trace of the covariance matrices of the first and second Gaussian random processes.

If the two covariance matrices $\Sigma_1$ and $\Sigma_2$ are commutative, then the following simplification applies $$tr\left(\Sigma_1 + \Sigma_2 - 2(\Sigma_1 \Sigma_2)^{\frac{1}{2}}\right) = tr\left(\left(\sum_1^{\frac{1}{2}} - \sum_1^{\frac{1}{2}}\right)^2\right),$$

and thus, $$W_2^2(GP_1, GP_2) = \frac{1}{n}\|m_1 - m_2\|_2^2 + \frac{1}{n} tr\left(\left(\sum_1^{\frac{1}{2}} - \sum_1^{\frac{1}{2}}\right)^2\right),$$

referred to in the following as formula (2).

For the computed model form error $\varepsilon \geq 0$ and simulation probability distribution $X_0$, a family of simulation probability distributions $\{X_\nu | \nu \in I\}$ is determined, for which their distances from $X_0$ are less than or equal to the model form error $\varepsilon$.

The family of simulation probability distributions $X_\nu$ is determined by integrating the model form error into an updated Gaussian random process. The simulation probability distributions of the family then satisfy the condition, that their distance from simulation probability distribution $X_0$ is less than or equal to model form error $\varepsilon$.

According to one specific embodiment of the present invention, the determination of the first Gaussian random process for the simulation probability distribution and/or the determination of the second Gaussian random process for the reference probability distribution is based on an estimation method. This means that a Gaussian random process, which corresponds most closely to the simulation probability distribution, is estimated from the set of simulation time series, which are produced from the simulation. For the reference data, one may proceed in a corresponding manner.

According to an alternative or additional specific embodiment of the present invention, the determination of the first Gaussian random process for the simulation probability distribution and/or the determination of the second Gaussian random process for the reference probability distribution may be based on a machine learning method.

The specific methods, which may be used in this connection, are a function of the number of available time series x and y. For a large number of time series, it is advantageous to estimate the parameters of the Gaussian process, mean $m_i$ and covariance matrix $\Sigma_i$, empirically in a manner analogous to an estimation method in the case of a one-dimensional normal distribution. For x<n or y<n, the covariance matrix is no longer necessarily invertible, and a shrinkage method or a so-called Gaussian process regression is advantageously used. The latter method requires more a-priori assumptions about the distribution of the process, but may, in return, cope with very few time series, in particular, with x=1 or y=1. This Gaussian regression is conventional in the area of machine learning.

It may prove to be advantageous for heteroskedastic Gaussian random processes to be used in the regression.

In the following, different variants for integrating the model form error into the updated Gaussian random process are provided. In this manner, the method may be advantageously adapted to different applications.

According to one specific embodiment of the present invention, the integration of the model form error into the updated Gaussian random process includes updating the mean of the Gaussian random process.

For a model error having the value $\varepsilon \geq 0$, a family of simulation probability distributions is determined, using a vector $v \in \mathbb{R}^n$, in which the mean of the Gaussian random process is updated. In this case, the updated Gaussian random process may be represented as $$X_\nu \sim N(m_X + \varepsilon v, \Sigma_X).$$

As long as $\|v\|_2 \leq \sqrt{n}$, then each simulation probability distribution, which is represented by updated Gaussian random process $X_v$, has a distance from first Gaussian random process $X_0$ less than or equal to model error $\varepsilon$. This may be shown by $$W_2^2(X_v, X_0) =$$

$$\frac{1}{n}\|(m_X - \varepsilon v) - m_X\|_2^2 + \frac{1}{n}tr\left(\Sigma_X + \Sigma_X - 2(\Sigma_X \Sigma_X)^{\frac{1}{2}}\right) = \frac{\varepsilon^2}{n}\|v\|_2^2 \leq \varepsilon^2.$$

In this case, the mean of the Gaussian random process is updated by subtracting or adding an offset to the mean. In principle, this corresponds to a vector v, in which all of the components are equal and the absolute value of the components is less than or equal to one. Occasionally, this selection may lead to results that are not very realistic. In these cases, it may then prove to be advantageous to adjust the mean in such a manner, that it corresponds or at least approximately corresponds to the mean of the reference probability distribution. This may be achieved by a vector v, where $$v = \frac{\sqrt{n}(m_Y - m_X)}{\|m_Y - m_X\|_2}.$$

Updated Gaussian random process $X_v$ then clearly includes a model form error, which corresponds to s. In this case, since the model form error is only attributable to different means, that is, $\Sigma_X = \Sigma_Y$ for the covariance matrices, $$\varepsilon = n^{-1/2}\|m_Y - m_X\|_2.$$

In this case, the updated mean $m_X + \varepsilon v = m_Y$ actually corresponds to the mean of the second Gaussian process exactly, which represents the reference probability distribution. For general reference probability distributions Y, the mean of the Gaussian process updated in such a manner corresponds to the mean $m_Y$ most closely and simultaneously has the correct model form error.

According to one specific embodiment of the present invention, it may also prove to be advantageous, if the updating of the mean of the Gaussian random process includes the integration of a numerical error. In particular, this may then be advantageous, if the time series is the solution of a differential equation, that is, of a numerical integration. In this case, it is to be expected that the model error accumulates over time. In this case, it has proven to be advantageous to use vectors v, whose components, which represent the time steps, grow linearly with $$v_k = \frac{2k}{n+1},$$

for then $$\|v\|_2^2 = \sum_{k=1}^n (v_k)^2 = \frac{2}{n+1}\sum_{k=1}^n k = \frac{2}{n-1}\frac{n(n+1)}{2} = n.$$

Consequently, the updated Gaussian process having mean $m_X + \varepsilon v$ constitutes a signal having a model form error, which is typical of solutions of differential equations.

According to a further specific embodiment, it may prove to be advantageous, if the integration of the model form error includes the updating of the variance of the Gaussian random process. In such a case, the updated Gaussian process differs from the original simulation probability distribution $X_0$ not by another mean, but by the variance.

In this context, it may prove advantageous if the variance of the Gaussian random process is updated and the mean and the covariance of the Gaussian random process are retained. In this case, the updated Gaussian random process may be represented as $$X_V \sim N\left(m_X, \left(\Sigma_X^{\frac{1}{2}} + \varepsilon V\right)^2\right).$$

In this case, diagonal matrix $V := \text{diag}(v_0)$ is defined for vector $v_0 = (1, 1, \ldots, 1)$. This vector has the norm $\|v_0\|_2 = \sqrt{n}$. In addition, $$\Sigma_X^{\frac{1}{2}} + \varepsilon V$$

is still positive definite, since this is the case for $\Sigma_X$. Furthermore, $\Sigma_x V = V \Sigma_x$, and consequently, the sum $$\Sigma_x^{\frac{1}{2}} + \varepsilon V$$

and $\Sigma_x$ are commutative.

For this reason, the simplified formula (2) may be used for calculating the 2-Wasserstein distance between the updated Gaussian random process and the first Gaussian random process. Consequently, each simulation probability distribution, which is represented by updated Gaussian process $X_v$, has a distance from first Gaussian random process $X_0$ equal to model error $\varepsilon$, since $$W_2^2(X_0, X_V) =$$

$$\frac{1}{n}\|m_X - m_X\|_2^2 + \frac{1}{n}tr\left(\left(\Sigma_X^{\frac{1}{2}} - \left(\Sigma_X^{\frac{1}{2}} + \varepsilon V\right)\right)^2\right) = \frac{1}{n}tr(\varepsilon^2 V^2) = \frac{\varepsilon^2}{n}\|v_0\|_2^2 = \varepsilon^2.$$

In addition, it may prove advantageous, when the variance of the Gaussian random process is updated by scaling the covariance of the Gaussian random process. In this case, the covariance is scaled by $(1+\delta)^2$, where $\delta$ is selected according to $$\delta := \varepsilon \sqrt{\frac{n}{tr(\Sigma_X)}}.$$

In this case, the updated Gaussian random process may be represented as $$X_\delta \sim N(m_X, (1+\delta)^2 \Sigma_X).$$

The 2-Wasserstein distance of the updated Gaussian process from the first Gaussian process of the simulation probability distribution corresponds to model form error ε. This may be represented as follows:

$$W_2^2(X_0, X_\delta) = \frac{1}{n}\|m_X - m_X\|_2^2 + \frac{1}{n}tr\left(\left(\sum_X^{\frac{1}{2}} - (1+\delta)\sum_X^{\frac{1}{2}}\right)^2\right) = \frac{\varepsilon^2}{n}(\Sigma_X) = \varepsilon^2.$$

Formula (2) may be used in this case, as well, since $(1+\delta)^2\Sigma_X$ and covariance matrix $\Sigma_X$ are commutative.

According to a further specific embodiment of the present invention, the model form error is advantageously integrated into the first Gaussian random process by updating the mean and the variance of the Gaussian random process. Thus, in this case, it is provided that the updating of the mean and the variance be combined. In this case, for every $\alpha \in [0,1]$, the updated Gaussian random process may be represented as $$X_\alpha \sim N\left(m_X + (1-\alpha)^{\frac{1}{2}}\varepsilon w, \left(\sum_X^{\frac{1}{2}} + \alpha^{\frac{1}{2}}\varepsilon V\right)^2\right).$$

Diagonal matrix $V:=\text{diag}(v_0)$ is defined for the vector $v_0=(1, 1, \ldots, 1)$. Vector w is an arbitrary vector w having the norm $\|w\|_2=\sqrt{n}$. Using the results of the offsets for updating the mean of the Gaussian random process and for updating the variance of the Gaussian random process, the following applies:

$$W_2^2(X_0, X_\alpha) = \frac{(1-\alpha)}{n}\varepsilon^2\|w\|_2^2 + \frac{\alpha}{n}\varepsilon^2\|v_0\|_2^2 = \frac{\varepsilon^2}{n}(\Sigma_X) = \varepsilon^2.$$

Further specific embodiments of the present invention relate to the use of simulation data, in particular, a family of simulation probability distributions, which were determined by a method according to the specific embodiments, to validate a simulation model of a technical system, in particular, software, hardware, or an embedded system, in particular, in the development of the technical system.

The simulation model is, for example, a hardware in the loop (HiL) or a software in the loop (SiL) simulation model. In this case, the simulation model is used for simulating the actual environment of the technical system. HiL and SiL are methods for testing hardware and embedded systems or software, for example, for support during the development, as well as for early initial operation. For example, a simulation-based release may be supported by the use of the method for validating a simulation model of a technical system, in particular, software, hardware or an embedded system, in particular, in the development of the technical system.

The technical system is, for example, software, hardware or an embedded system. The technical system is, in particular, a technical system, for example, a control unit or software for a control unit, for a motor vehicle, in particular, for an autonomous or semiautonomous motor vehicle. In particular, in the automotive branch, simulation models often include multidimensional signals.

With the aid of the described method for determining the family of simulation probability distributions in accordance with the present invention, by integrating the model form error into an updated Gaussian random process, the model form error is already included in the development of the technical system during the validation of the simulation model of the technical system. The described method is used, in particular, in temporally-changing, that is, time-dependent, systems. By determining the model form error, the timing error may be propagated and the effect on the overall performance may be analyzed. This is of particular significance in the context of autonomous driving, where reliable SiL systems are indispensable. In addition, the method may be of use in the validation of complex vehicle and power train simulations.

Additional features, uses and advantages of the present invention are derived from the following description of exemplary embodiments of the present invention, which are represented in the figures. In this context, all of the described or illustrated features form the subject matter of the present invention, either alone or in any combination, irrespective of their formulation and illustration in the description and in the figures, respectively.

DETAILED DESCRIPTION OF EXAMPLE EMBODIMENTS

Figure 1:
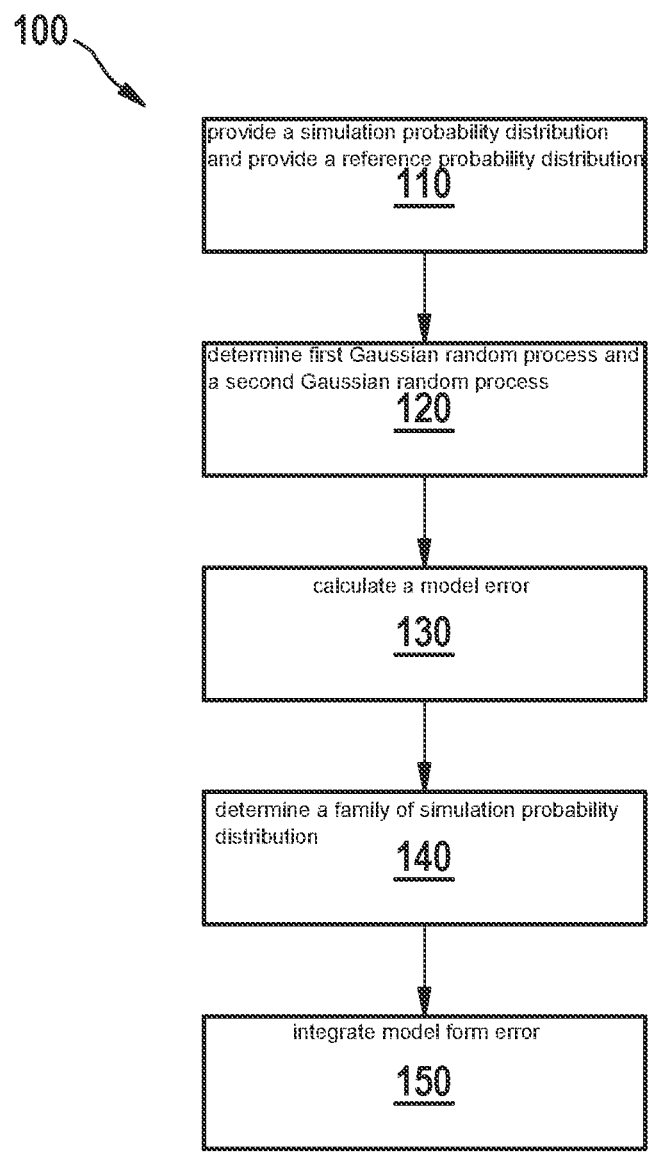
FIG. 1 shows a schematic representation of aspects of a computer-implemented method, in accordance with an example embodiment of the present invention.

FIG. 1 schematically shows steps of a method 100 for determining simulation data.

Method 100 includes a step 110 for providing a simulation probability distribution including a number x of simulation time series $X_0$, and for providing a reference probability distribution including a number y of reference time series $Y_0$. A specific simulation time series and a respective reference time series are each supplied as an n-dimensional vector, where n corresponds to the number of recorded time steps.

The simulation probability distribution includes a number x of simulation time series, and the reference probability distribution includes a number y of reference time series, where $x,y \in \mathbb{N}$ and $x,y>1$.

Method 100 includes a step 120 for determining a first Gaussian random process for the simulation probability distribution, and for determining a second Gaussian random process for the reference probability distribution; a Gaussian random process being assigned a mean and a covariance matrix.

The first and the second Gaussian random processes are multivariate normal distributions. In this context, each Gaussian random process is assigned a mean and a covariance matrix:

$$GP_i \sim N(m_i, \Sigma_i)$$

where mean $m_i \in \mathbb{R}^n$ and covariance matrix $\Sigma_i \in \mathbb{R}^{n \times n}$.

Thus, the simulation probability distribution is represented by the first Gaussian random process with $$X_0 \approx N(m_X, \Sigma_X),$$

and the reference probability distribution is represented by the second Gaussian random process with $$Y_0 \approx N(m_Y, \Sigma_Y).$$

The determination 120 of the first Gaussian random process for the simulation probability distribution and/or the determination 120 of the second Gaussian random process for the reference probability distribution is based on an estimation method. This means that a Gaussian random process, which corresponds most closely to the simulation probability distribution, is estimated from the set of simulation time series, which are produced from the simulation. For the reference data, one may proceed in a corresponding manner. In the case of a sufficiently large number x of simulation time series and/or number y of reference time series, the mean and the covariance of the respective Gaussian random process may be estimated empirically.

According to an alternative or additional specific embodiment, the determination 120 of the first Gaussian random process for the simulation probability distribution and/or the determination 120 of the second Gaussian random process for the reference probability distribution may be based on a machine learning method.

Figure 2A:
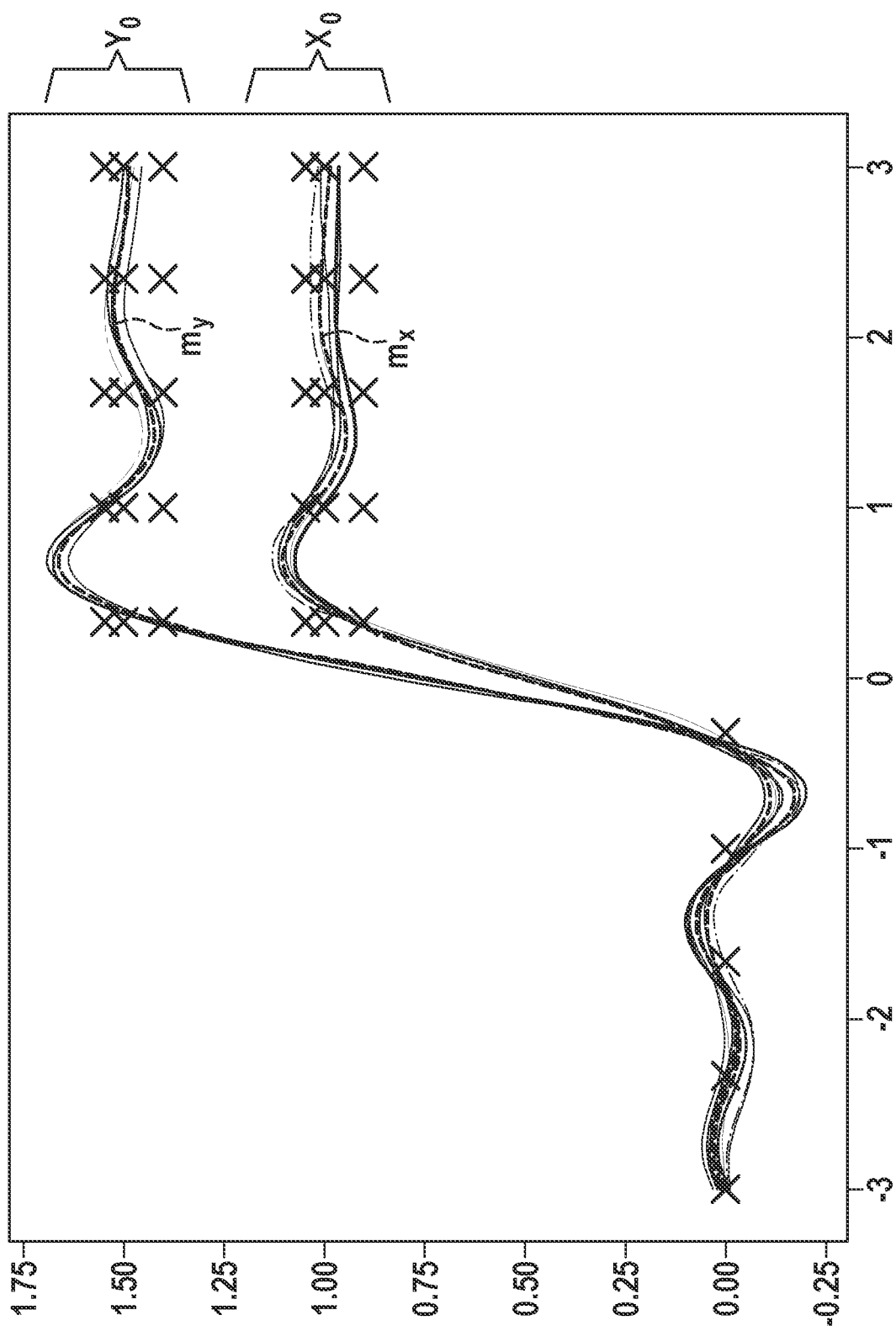
FIG. 2A through 2D show different representations of simulation data and reference data, in accordance with an example embodiment of the present invention.

Examples of values of three simulation time series $X_0$ and values of three reference time series $Y_0$, each having ten plotted time steps, are represented as crosses in FIG. 2A. A random sample, that is, in each case, a time series from the estimated Gaussian process, is shown, by way of example, for each time series, by the solid lines. In addition, mean $m_x$ of the first Gaussian random process and mean $m_y$ of the second Gaussian random process are represented, by way of example, by the dashed lines. Means $m_x$ and $m_y$ were determined, for example, with the aid of Gaussian process regression, using a radial basis function (RBF) kernel.

Figure 2B:
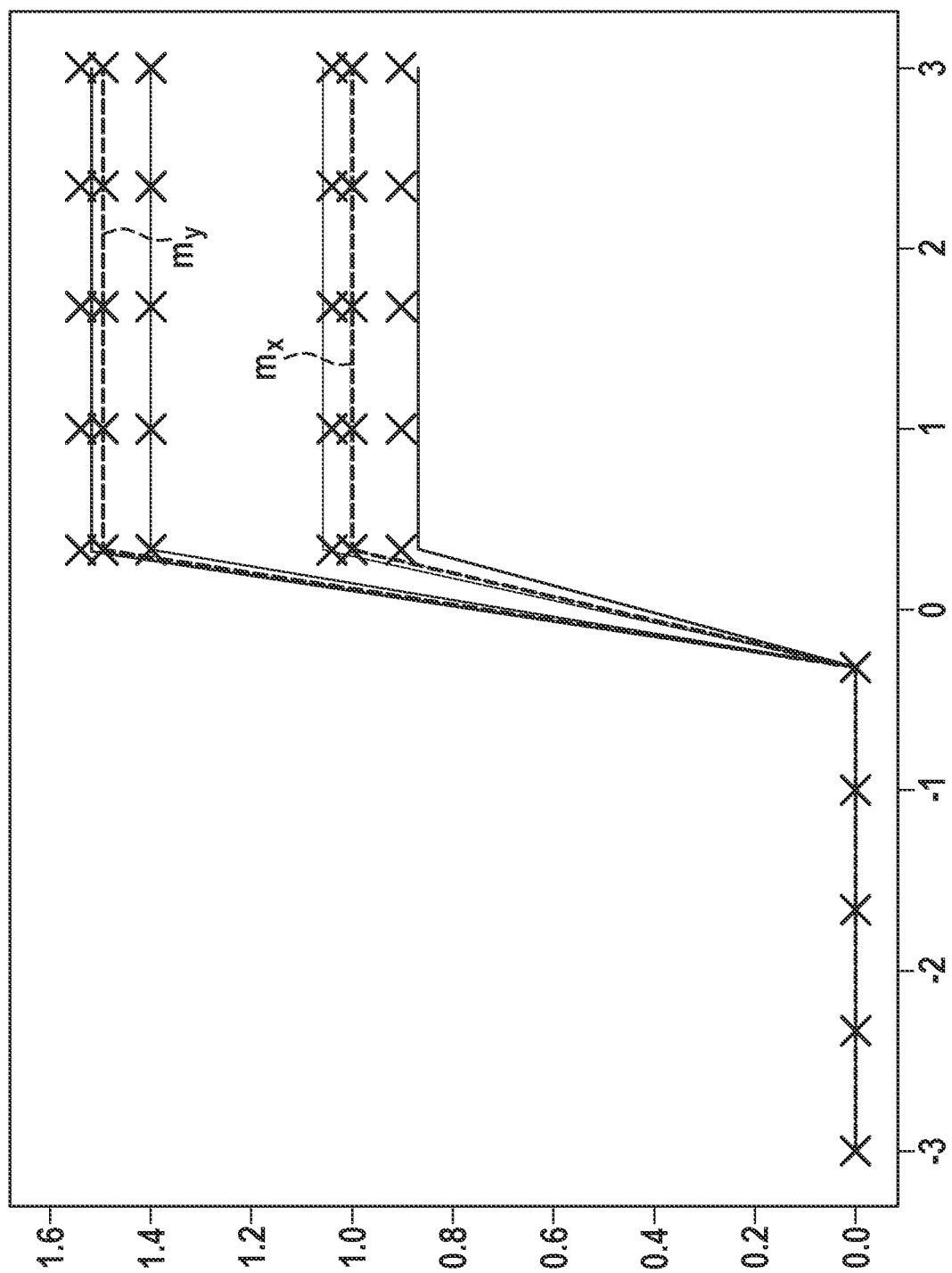

A random sample, that is, in each case, a time series from the estimated Gaussian process, is also shown, by way of example, in FIG. 2B, by the solid lines. In addition, mean $m_x$ of the first Gaussian random process and mean $m_y$ of the second Gaussian random process are represented, by way of example, by the dashed lines. Means $m_x$ and $m_y$ are estimated empirically.

Method 100 includes a step 130 of calculating a model error with the aid of the 2-Wasserstein distance between the first Gaussian random process and the second Gaussian random process over the Euclidian distance of the means of the first and second Gaussian random processes and the trace of the covariance matrices of the first and second Gaussian random processes. In principle, the normalized Euclidian distance metric, also known as the root mean square error RMSE, may be used as a basic distance for determining the distance between two individual time series over a time interval [0, T], which were recorded at n points within this interval $$d(x, y) = n^{\frac{1}{2}} \|x - y\|_2.$$

The normalized Euclidian distance approximates the integral $L_2$-distance on the interval [0, T] for a large number n of time steps. This basic distance is used to construct the 2-Wasserstein distance.

For normally distributed Gaussian random processes $GP_i \sim N(m_i, \Sigma_i)$ having a mean $m_i \in \mathbb{R}^n$ and a positive definite, in particular, invertible, covariance matrix $\Sigma_i \in \mathbb{R}^{n \times n}$, the following applies for the 2-Wasserstein distance and, therefore, for the model form error $\varepsilon$, where $\varepsilon^2 = W_2^2(X_0, Y_0)$.

$$W_2^2(GP_1, GP_2) = \frac{1}{n}\|m_1 - m_2\|_2^2 + \frac{1}{n}tr\left(\Sigma_1 + \Sigma_2 - 2(\Sigma_1 \Sigma_2)^{\frac{1}{2}}\right).$$

In the description, reference is made to this formula as formula (1).

Thus, the model form error is calculated over the Euclidian distance of the means of the first and second Gaussian random processes and the trace of the covariance matrices of the first and second Gaussian random processes.

If the two covariance matrices $\Sigma_1$ and $\Sigma_2$ are commutative, then the following simplification applies $$tr\left(\Sigma_1 + \Sigma_2 - 2(\Sigma_1\Sigma_2)^{\frac{1}{2}}\right) = tr\left(\left(\sum\nolimits_1^{\frac{1}{2}} - \sum\nolimits_1^{\frac{1}{2}}\right)^2\right),$$

and thus, $$W_2^2(GP_1, GP_2) = \frac{1}{n}\|m_1 - m_2\|_2^2 + \frac{1}{n}tr\left(\left(\sum\nolimits_1^{\frac{1}{2}} - \sum\nolimits_1^{\frac{1}{2}}\right)^2\right).$$

In the description, reference is made to this formula as formula (2).

Method 100 includes a step 140 for determining a family of simulation probability distributions $X_v$, by integrating 150 the model form error into an updated Gaussian random process.

For the computed model form error $\varepsilon \geq 0$ and simulation probability distribution $X_0$, a family of simulation probability distributions $\{X_v | v \in I\}$ is determined, for which their distances from $X_0$ are less than or equal to model form error E.

The family of simulation probability distributions $X_v$ is determined by integrating the model form error into an updated Gaussian random process. The simulation probability distributions of the family then satisfy the condition, that their distance from the simulation probability distribution $X_0$ is less than or equal to model form error $\varepsilon$.

In the following, different variants for integrating 150 the model form error into the updated Gaussian random process are provided. In this manner, method 100 may be advantageously adapted to different applications.

According to one specific embodiment, the integration 150 of the model form error into the updated Gaussian random process includes updating 150a the mean of the Gaussian random process.

For a model error having the value $\varepsilon \geq 0$, a family of simulation probability distributions is determined, using a vector $v \in \mathbb{R}^n$, in which the mean of the Gaussian random process is updated. In this case, the updated Gaussian random process may be represented as $$X_v \sim N(m_X + \varepsilon v, \Sigma_X).$$

As long as $\|v\|_2 \leq \sqrt{n}$, then each simulation probability distribution, which is represented by updated Gaussian random process $X_v$, has a distance from first Gaussian random process $X_0$ less than or equal to model error $\varepsilon$. This may be shown by $$W_2^2(X_v, X_0) =$$

$$\frac{1}{n}\|(m_X - \varepsilon v) - m_X\|_2^2 + \frac{1}{n}tr\left(\Sigma_X + \Sigma_X - 2(\Sigma_X\Sigma_X)^{\frac{1}{2}}\right) = \frac{\varepsilon^2}{n}\|v\|_2^2 \leq \varepsilon^2.$$

In this case, the mean of the Gaussian random process is updated 150*a* by subtracting or adding an offset to the mean. In principle, this corresponds to a vector v, in which all of the components are equal and the absolute value of the components is less than or equal to one. Occasionally, this selection may lead to results that are not very realistic. In these cases, it may then prove to be advantageous to adjust the mean in such a manner, that it corresponds or at least approximately corresponds to the mean of the reference probability distribution. This may be achieved by a vector v, where $$v = \frac{\sqrt{n}(m_Y - m_X)}{\|m_Y - m_X\|_2}.$$

Updated Gaussian random process $X_v$ then clearly includes a model form error, which corresponds to ε. In this case, since the model form error is only attributable to different means, that is, $\Sigma_X = \Sigma_Y$ for the covariance matrices, then $$\varepsilon = n^{-1/2}\|m_Y - m_X\|_2.$$

In this case, updated mean $m_X + \varepsilon v = m_Y$ actually corresponds to the mean of the second Gaussian process exactly, which represents the reference probability distribution. For general reference probability distributions Y, the mean of the Gaussian process updated in such a manner corresponds to mean $m_Y$ most closely and simultaneously has the correct model form error.

According to one specific embodiment, it may also prove to be advantageous, if the updating 150*a* of the mean of the Gaussian random process includes the integration of a numerical error. In particular, this may then be advantageous, if the time series is the solution of a differential equation, that is, of a numerical integration. In this case, it is to be expected that the model error accumulates over time. In this case, it has proven to be advantageous to use vectors v, whose components, which represent the time steps, grow linearly with $$v_k = \frac{2k}{n+1},$$

for then $$\|v\|_2^2 = \sum_{k=1}^{n}(v_k)^2 = \frac{2}{n+1}\sum_{k=1}^{n}k = \frac{2}{n-1}\frac{n(n+1)}{2} = n.$$

Consequently, the updated Gaussian process having mean $m_X + \varepsilon v$ constitutes a signal having a model form error, which is typical of solutions of differential equations.

According to a further specific embodiment, it may prove to be advantageous, if the integration 150 of the model form error includes updating 150*b* the variance of the Gaussian random process. In such a case, the updated Gaussian process differs from the original simulation probability distribution $X_0$ not by another mean, but by the variance.

In this context, it may prove advantageous, if the variance of the Gaussian random process is updated 150*b* and the mean and the covariance of the Gaussian random process are retained. In this case, the updated Gaussian random process may be represented as $$X_V \sim N\left(m_X, \left(\Sigma_X^{\frac{1}{2}} + \varepsilon V\right)^2\right).$$

In this case, diagonal matrix $V := diag(v_0)$ is defined for vector $v_0 = (1, 1, \ldots, 1)$. This vector has the norm $\|v_0\|_2 = \sqrt{n}$. In addition, $$\Sigma_X^{\frac{1}{2}} + \varepsilon V$$

is still positive definite, since this is the case for $\Sigma_X$. Furthermore, $\Sigma_x V = V\Sigma_x$, and consequently, the sum $$\Sigma_x^{\frac{1}{2}} + \varepsilon V$$

and $\Sigma_x$ are commutative.

For this reason, the simplified formula (2) may be used for calculating the 2-Wasserstein distance between the updated Gaussian random process and the first Gaussian random process. Consequently, each simulation probability distribution, which is represented by updated Gaussian process $X_v$, has a distance from first Gaussian random process $X_0$ equal to model error ε, since $$W_2^2(X_0, X_V) =$$

$$\frac{1}{n}\|m_X - m_X\|_2^2 + \frac{1}{n}tr\left(\left(\Sigma_X^{\frac{1}{2}} - \left(\Sigma_X^{\frac{1}{2}} + \varepsilon V\right)\right)^2\right) = \frac{1}{n}tr(\varepsilon^2 V^2) = \frac{\varepsilon^2}{n}\|v_0\|_2^2 = \varepsilon^2.$$

Figure 2C:
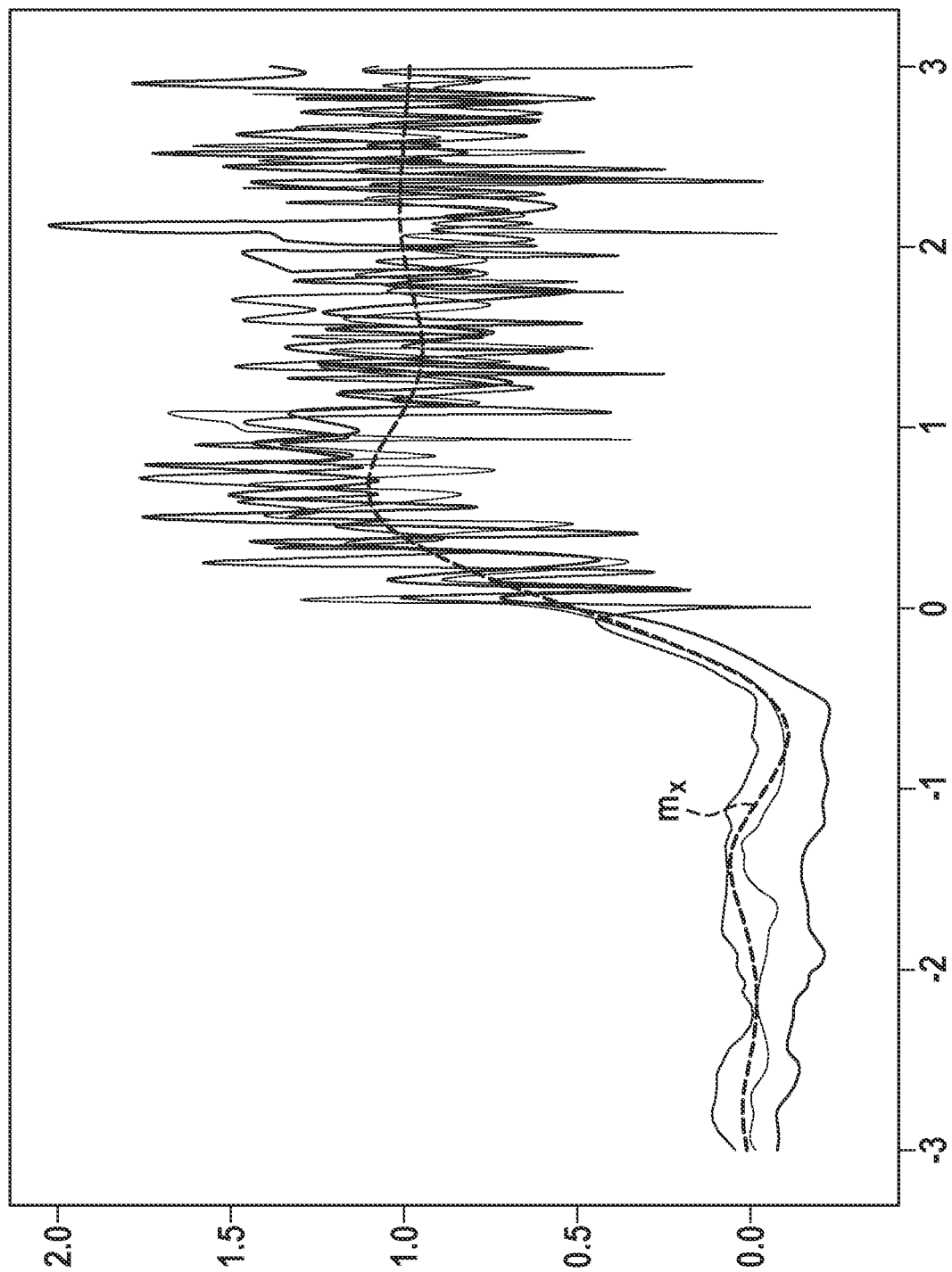

An example of an updated Gaussian random process $X_v$ is represented in FIG. 2C. There, it may be seen that as expected, the mean represented by a dashed line has not changed. The random samples from the process, that is, the random time series, which are represented by the solid lines, include markedly increased "noise." This drawing figure is an update of the X process from FIG. 2A.

In addition, it may prove advantageous, when the variance of the Gaussian random process is updated 150*b* by scaling the covariance of the Gaussian random process. In this case, the covariance is scaled by $(1+\delta)^2$, where δ is selected according to $$\delta := \varepsilon\sqrt{\frac{n}{tr(\Sigma_X)}}.$$

In this case, the updated Gaussian random process may be represented as $$X_\delta \sim N(m_X, (1+\delta)^2\Sigma_X).$$

The 2-Wasserstein distance of the updated Gaussian process from the first Gaussian process of the simulation probability distribution corresponds to model form error ε. This may be represented as follows:

$$W_2^2(X_0, X_\delta) = \frac{1}{n}\|m_X - m_X\|_2^2 + \frac{1}{n}tr\left(\left(\sum_X^{\frac{1}{2}} - (1+\delta)\sum_X^{\frac{1}{2}}\right)^2\right) = \frac{\varepsilon^2}{n}(\Sigma_X) = \varepsilon^2.$$

Figure 2D:
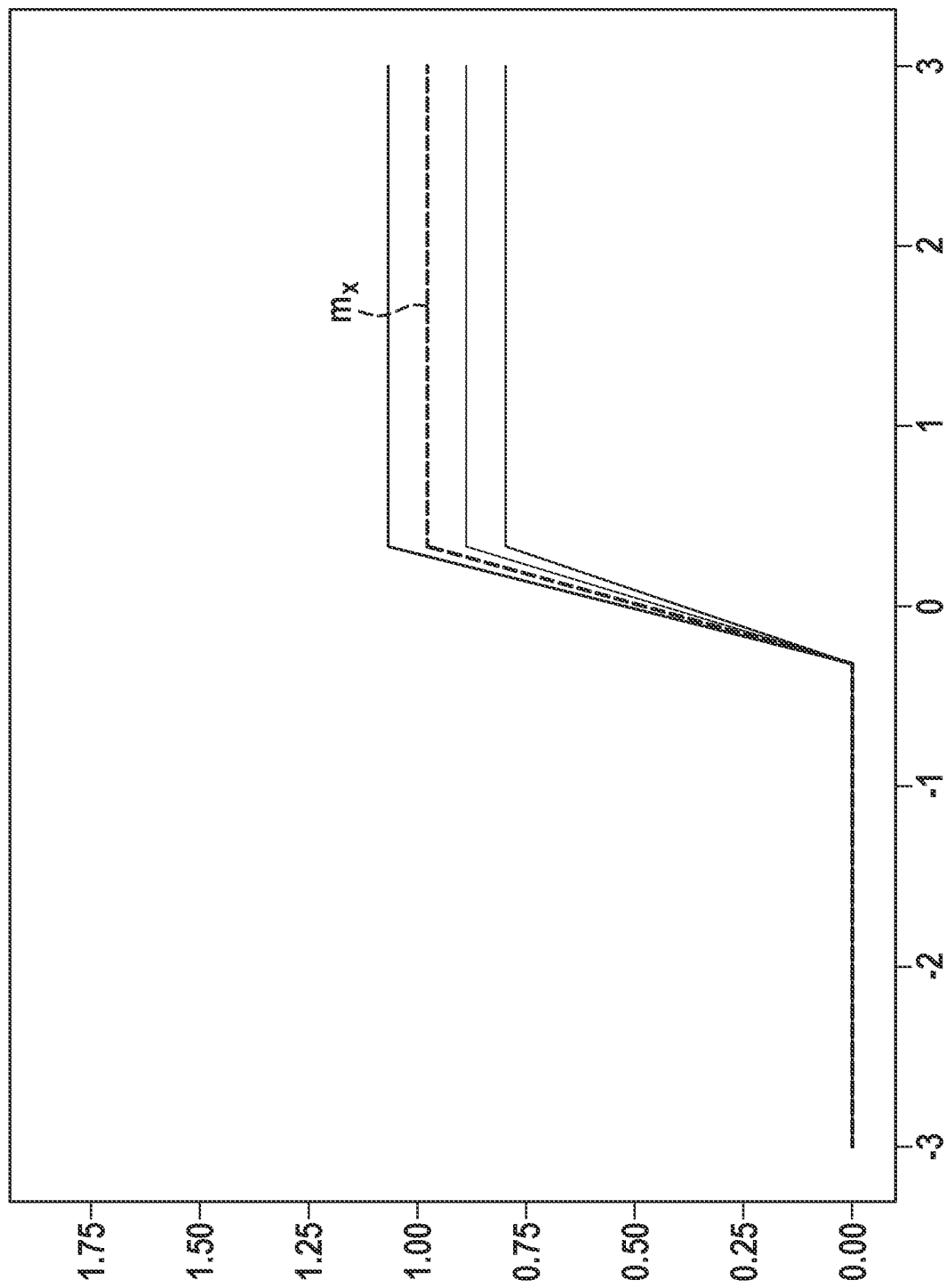

Formula (2) may be used in this case, as well, since $(1+\delta)^2\Sigma_X$ and covariance matrix $\Sigma_X$ are commutative. An example of an updated Gaussian random process $X_\nu$ is represented in FIG. 2D. In contrast to FIG. 2C, it is apparent from FIG. 2D that the noise does not increase, but that the random time series were fanned out, that is, are further away from each other on the right side of the figure. FIG. 2D shows an update of the X process from FIG. 2B.

According to a further specific embodiment, the model form error is advantageously integrated 150 into the first Gaussian random process, by updating 150a the mean and by updating 150b the variance of the Gaussian random process. Thus, in this case, it is provided that the updating of the mean and the variance be combined. In this case, for every $\alpha \in [0,1]$, the updated Gaussian random process may be represented as $$X_\alpha \sim N\left(m_X + (1-\alpha)^{\frac{1}{2}}\varepsilon w, \left(\sum_X^{\frac{1}{2}} + \alpha^{\frac{1}{2}}\varepsilon V\right)^2\right).$$

Diagonal matrix $V:=diag(v_0)$ is defined for the vector $v_0=(1, 1, \ldots, 1)$. Vector w is an arbitrary vector w having the norm $\|w\|_2 = \sqrt{n}$. Using the results of the offsets for updating the mean of the Gaussian random process and for updating the variance of the Gaussian random process, the following applies:

$$W_2^2(X_0, X_\alpha) = \frac{(1-\alpha)}{n}\varepsilon^2\|w\|_2^2 + \frac{\alpha}{n}\varepsilon^2\|v_0\|_2^2 = \frac{\varepsilon^2}{n}(\Sigma_X) = \varepsilon^2.$$

Figure 3:
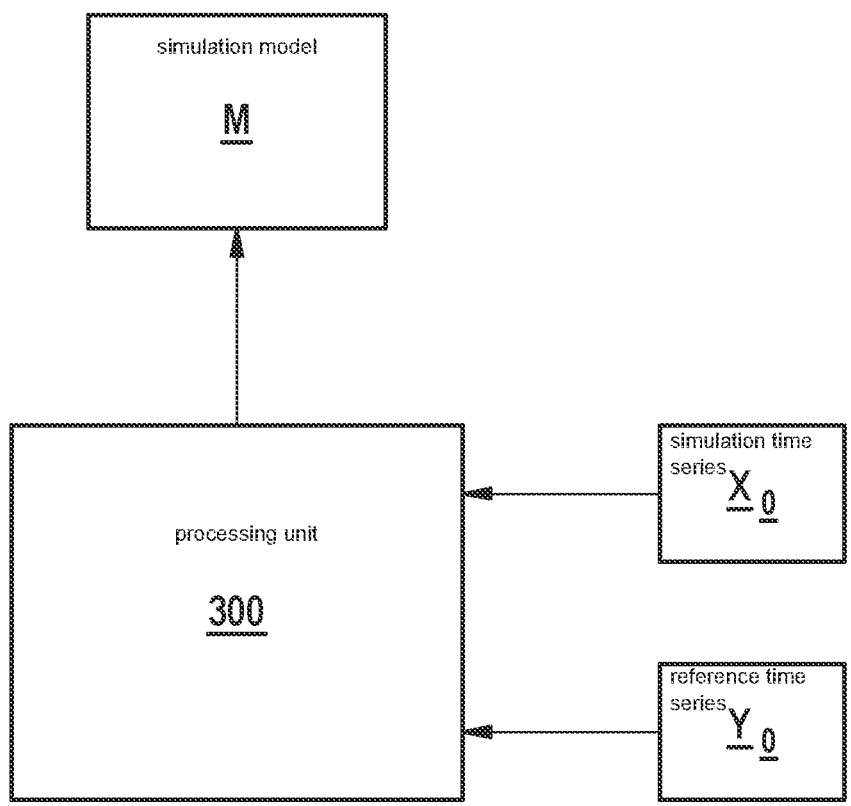
FIG. 3 shows a schematic representation of aspects of an application of the computer-implemented method from FIG. 1, in accordance with the present invention.

FIG. 3 shows an application of method 100 in the validation framework.

The simulation probability distribution includes a number x of simulation time series $X_0$, and the reference probability distribution includes a number y of reference time series $Y_0$. A specific simulation time series and a respective reference time series are each supplied as an n-dimensional vector, where n corresponds to the number of recorded time steps.

Through execution of method 100 in a processing unit 300, a family of simulation probability distributions is determined by integrating the model form error into an updated Gaussian random process.

The model form error may be integrated into simulation model M by the updated Gaussian random process.

Simulation model M is, for example, a hardware in the loop (HiL) or a software in the loop (SiL) simulation model. In this case, simulation model M is used for simulating the actual environment of the technical system. HiL and SiL are methods for testing hardware and embedded systems or software, for example, for support during the development, as well as for early initial operation. For example, a simulation-based release may be supported by the use of method 100 for validating a simulation model of a technical system, in particular, software, hardware or an embedded system, in particular, in the development of the technical system. In addition, by using method 100, an improved simulation model for developing and/or validating the technical system may be provided, and consequently, further advantageous, positive effects, such as increased safety, may be provided.

The technical system is, for example, software, hardware or an embedded system. The technical system is, in particular, a technical system, for example, a control unit or software for a control unit, for a motor vehicle, in particular, for an autonomous or semiautonomous motor vehicle. In particular, it may also be a safety-related technical system.

In particular, in the automotive branch, simulation models often include time series signals, if a time dependence of signals is intended to be considered.

What is claimed is:

1. A method for updating an autonomous vehicle, the method comprising the following steps:
   providing a simulation probability distribution including a number x of simulation time series, and providing a reference probability distribution including a number y of reference time series;
   determining a first Gaussian random process for the simulation probability distribution, and determining a second Gaussian random process for the reference probability distribution, each of the first and second Gaussian random processes being assigned a respective mean and a respective covariance matrix;
   calculating, by a processor system that includes at least one processor, a model form error using a 2-Wasserstein distance between the first Gaussian random process and the second Gaussian random process based on a Euclidean distance of the respective means of the first and second Gaussian random processes and based on a trace of the respective covariance matrices of the first and second Gaussian random processes;
   determining, by the processor system, a family of simulation probability distributions by integrating the model form error into an updated version of the first Gaussian random process;
   modifying, by the processor system, a simulation model based on the family of simulation probability distributions;
   running, by the processor system, a hardware in the loop (HiL) or a software in the loop (SiL) simulation of a controller of the autonomous motor vehicle with the simulation model; and
   based on results of the simulation modifying, by the processor system, the controller of the autonomous motor vehicle, thereby modifying an operability of the autonomous motor vehicle.

2. The method as recited in claim 1, wherein the determination of the first Gaussian random process for the simulation probability distribution and/or the determination of the second Gaussian random process for the reference probability distribution is based on an estimation method.

3. The method as recited in claim 1, wherein the determination of the first Gaussian random process for the simulation probability distribution and/or the determination of the second Gaussian random process for the reference probability distribution is based on a machine learning method.

4. The method as recited in claim 1, wherein the integration of the model form error into the updated version of the first Gaussian random process includes updating a mean of the first Gaussian random process.

5. The method as recited in claim 4, wherein the updating of the mean of the first Gaussian random process includes integrating a numerical error.

6. The method as recited in claim 1, wherein the integration of the model form error includes updating a variance of the first Gaussian random process while retaining a prior mean and a prior covariance of the first Gaussian random process.

7. The method as recited in claim 1, wherein the integration of the model form error includes updating a variance of the first Gaussian random process.

8. The method as recited in claim 6, wherein the updating of the variance of the first Gaussian random process is performed by scaling a covariance of the first Gaussian random process.

9. The method as recited in claim 1, wherein the integrating of the model form error into the updated version of the first Gaussian random process is performed by updating both a mean and a variance of the first Gaussian random process.

10. The method as recited in claim 1, wherein the modifying of the controller includes modifying software of the controller.

11. The method as recited in claim 1, wherein the modifying of the controller includes modifying hardware of the controller.

\* \* \* \* \*